United States Patent [19]

Berghoefer

[11] Patent Number: 5,090,368
[45] Date of Patent: Feb. 25, 1992

[54] ANIMAL CARRIER

[76] Inventor: Leonard A. Berghoefer, R.R. 4, Box 48, Hampton, Iowa 50441

[21] Appl. No.: 597,397

[22] Filed: Oct. 15, 1990

[51] Int. Cl.[5] ............................................. A01K 29/00
[52] U.S. Cl. .................................. 119/96; 280/47.17
[58] Field of Search ................ 119/96, 101, 102, 151; 280/47.17, 47.18; 54/2

[56] References Cited

U.S. PATENT DOCUMENTS

| | | | |
|---|---|---|---|
| 2,183,066 | 12/1939 | Fields | 280/47.18 X |
| 3,403,923 | 10/1968 | Mouchet | 280/47.17 X |
| 3,406,661 | 10/1968 | Parks | 119/1 |
| 4,309,963 | 1/1982 | Forrest | 119/96 |
| 4,449,481 | 5/1984 | Dear et al. | 119/96 |
| 4,567,853 | 2/1986 | Hayden | 119/102 |

FOREIGN PATENT DOCUMENTS

| | | | |
|---|---|---|---|
| 730169 | 8/1932 | France | 280/47.18 |
| 170531 | 10/1921 | United Kingdom | 280/47.18 |

*Primary Examiner*—Robert P. Swiatek
*Attorney, Agent, or Firm*—Henderson & Sturm

[57] ABSTRACT

An animal carrier including a frame having a ground engaging portion, a lever extending forward of the frame, and an animal receiving cradle extending from the rear of the frame. The cradle includes a rearwardly extending central finger and a pair of lateral fingers that extend generally parallel to and above the central finger on opposite lateral sides thereof. The cradle is movable between a lowered loading position where the central finger can be positioned under the body of and between the rear and front legs of the animal, and a raised transport position where the central finger supports the animal above ground level and the lateral fingers maintains the animal in an upright position.

2 Claims, 2 Drawing Sheets

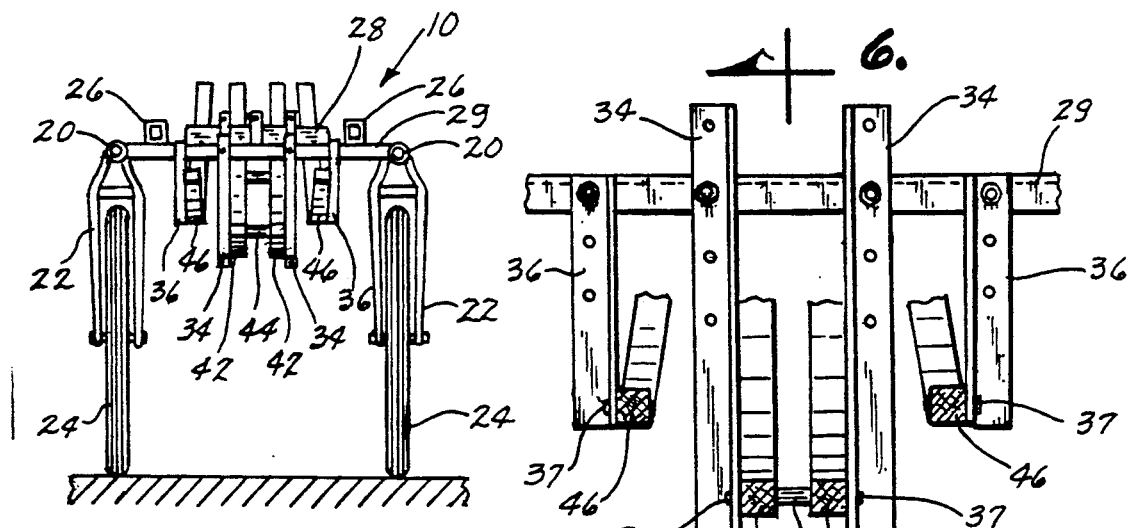
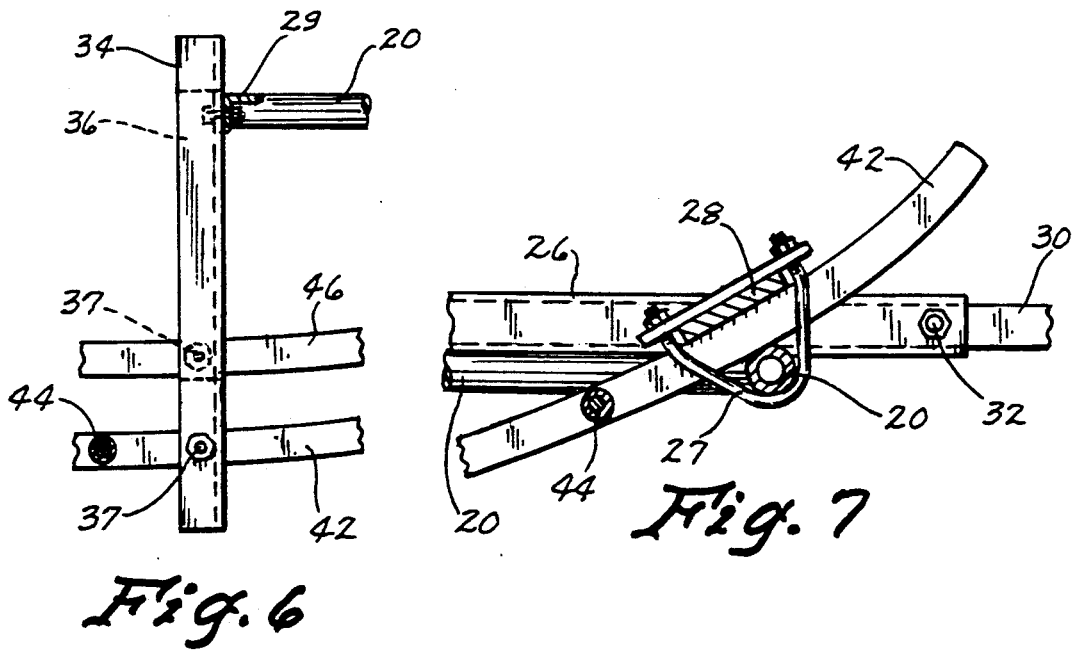

5,090,368

ANIMAL CARRIER

TECHNICAL FIELD

This invention relates to an animal handling device, and more particularly to a carrier for transporting a new-born animal.

BACKGROUND ART

Domesticated animals, such as calves, may be born in the field some distance from other facilities, or in birthing areas of sheds or pens. In either case, it is often necessary to provide special attention or treatment to the animals. In order to effectively attend to the new-born animal, it must be moved to a clean, dry area to minimize the risk of disease.

A new-born calf is unable to walk until it is two or three days old. Therefore, it must be moved by other means. Also, it is imperative that the calf and its mother be kept together so that the mother will not forget which calf is hers, causing her to reject it and refuse to nurse.

Known methods for transporting calves include manually lifting the calf into the box of a pickup truck, or tying the calf down on a sled to be towed manually or by a vehicle. These methods require strenuous labor and intimate contact of the herdsman with the afterbirth and manure in the calving pen or pasture. Also, these methods require the herdsman to be in near proximity to the cow, which at times after calving can become quite nervous and protective of the calf, posing a threat to the herdsman. Further, as the calf is being moved, the mother will not follow the calf unless the movement process appears natural to her. The calf should therefore be moved in a natural upright position so the cow will follow, constantly sniffing and smelling the calf to assure herself it is her own.

Those concerned with these and other problems recognize the need for an improved animal carrier.

DISCLOSURE OF THE INVENTION

The present invention provides an animal carrier including a frame having a ground engaging portion, a lever extending forward of the frame, and an animal receiving cradle extending from the rear of the frame. The cradle includes a rearwardly extending central finger and a pair of lateral fingers that extend generally parallel to and above the central finger on opposite lateral sides thereof. The cradle is movable between a lowered loading position where the central finger can be positioned under the body of and between the rear and front legs of the animal, and a raised transport position where the central finger supports the animal above ground level and the lateral fingers maintain the animal in an upright position.

An object of the present invention is the provision of an improved animal carrier.

Another object is to provide an animal carrier that is convenient and easy to use.

A further object of the invention is the provision of a animal carrier that positions the new-born animal between the herdsman and the mother.

Still another object is to provide an animal carrier that allows for movement of the animal in a natural upright position.

A still further object of the present invention is the provision of an animal carrier that is uncomplicated in structure, inexpensive to manufacture, durable, and easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 4 is a rear elevational view taken along line 4—4 of FIG. 3;

FIG. 5 is an enlarged rear elevation sectional view taken along line 5—5 of FIG. 2;

FIG. 6 is a side elevation sectional view taken along line 6—6 of FIG. 5; and

FIG. 7 is an enlarged side elevation sectional view taken along line 7—7 of FIG. 2.

BEST MODE FOR CARRYING OUT THE INVENTION

Figure 1:
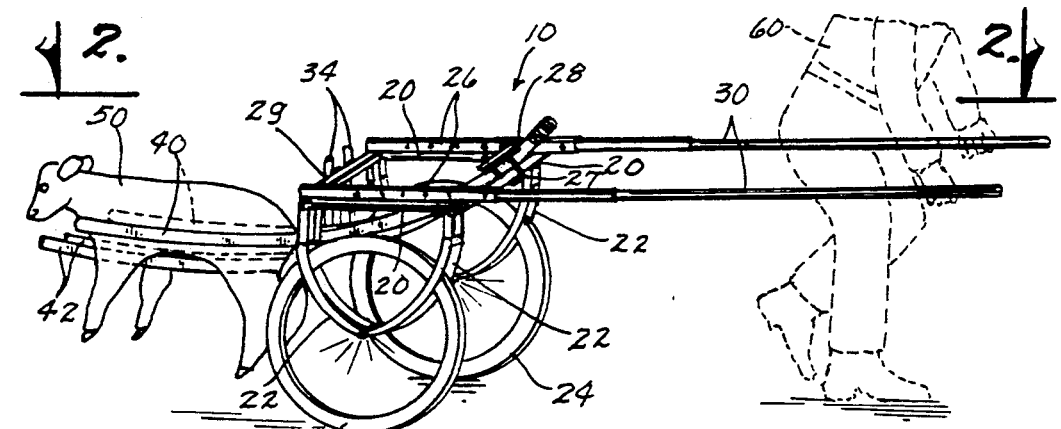
FIG. 1 is a perspective view of the animal carrier of the present invention illustrating a calf being supported above ground level on the cradle by a herdsman exerting downwardly directed force on the hand levers.
Figure 2:
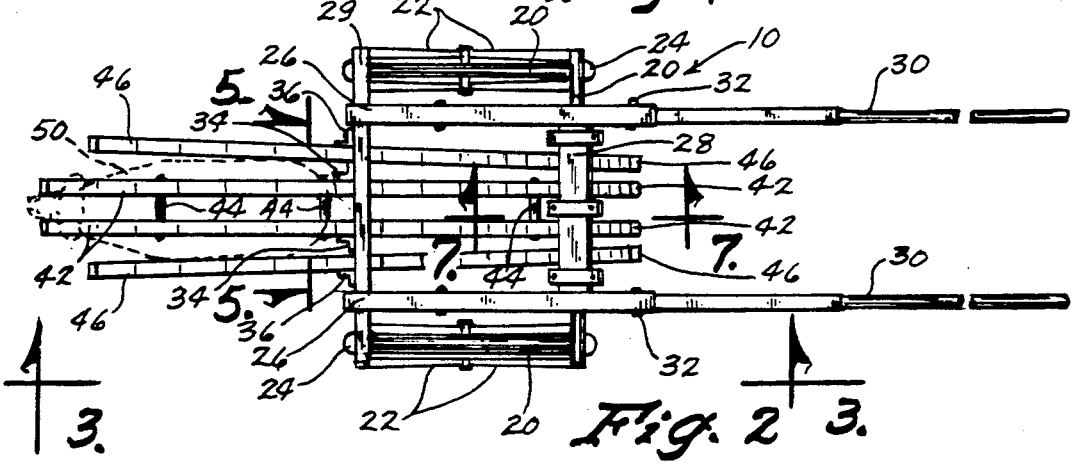
FIG. 2 is a top plan view of the animal carrier.

Referring now to the drawings, wherein like reference numerals designate identical or corresponding parts throughout the several views, FIG. 1 shows the animal carrier (10) of the present invention. The carrier includes a frame member (20) having downwardly extending yokes (22) at each lateral side. Each yoke (22) carries a rotatably mounted ground engaging wheel (24). The upper part of the frame (20) carries a pair of laterally spaced tubular members (26) disposed to receive forwardly extending lever handles (30). The handles (30) are telescopically received in tubular members (26) and are selectively extendable and secured by fasteners (32). A forward cross member (28) and a rear cross member (29) extend between and interconnect the tubular members (26). The rear cross member (29) carries a pair of vertically adjustable central standards (34) and a pair of vertically adjustable lateral standards (36).

Figure 3:
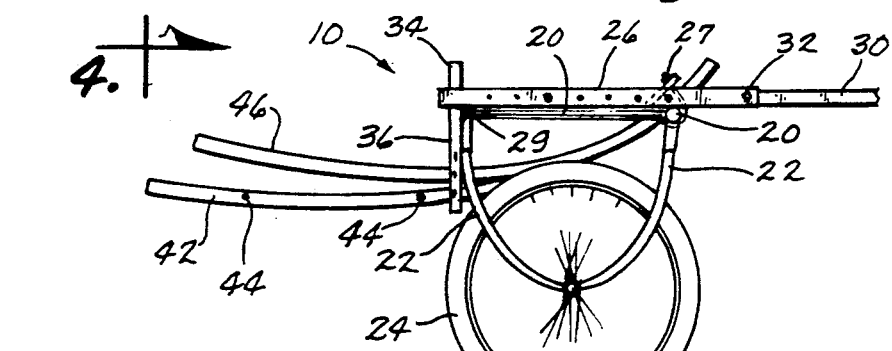
FIG. 3 is a side elevational view taken along line 3—3 of FIG. 2.

A cradle (40) is attached to the frame (20) by connection to the forward cross member (28) by U-bolts (27), and connected to the vertically adjustable standards (34, 36) by bolts (37). The cradle (40) extends to the rear of the frame (20) and includes a central finger having a pair of laterally spaced rods (42) interconnected by spacer bars (44), and a pair of lateral fingers (46) disposed parallel to and above the central finger. Both the central finger and the lateral fingers (46) are formed in an upwardly directed arc as best shown in FIG. 3.

In operation, the animal carrier (10) carries an animal such as a calf (50) in an upright standing position without any discomfort to the calf. The handles (30) are used by the herdsman (60) as a lever to slide the cradle (40) under the calf. With the calf in the cradle (40), the handles (30) are pushed down raising the calf off the ground ready for transport. The carrier (10) is designed to move newborn calves, but could be used for a variety of other animals. The carrier (10) has a built-in safety feature that keeps the calf between the herdsman and the cow. After calving, the cow can become quite nervous and protective of the calf, posing a threat to the herdsman moving the calf.

The carrier (10) is designed for one man operation. If the calf is standing, the cradle (40) is slid under the calf. If the calf is lying down, the calf's tail is used to lift the calf slightly and then the cradle (40) is slid under the calf. The handles (30) can be slid under a fence panel and the calf can be either ear tagged or medicated while resting on the cradle (40). The calf is quite comfortable and doesn't fight while this work is accomplished. The carrier (10) is designed to carry a calf weighing from 50 pounds to 125 pounds. The carrier (10) can be used while carrying a calf to lead the cow into a pen since the calf is supported on the central finger and held in a natural upright position by the lateral fingers (46).

A hitch can be adapted to the handles (30) and hooked up to an all terrain vehicle, a pickup or a tractor. If the calf is to be moved long distances, a safety belt may be used so the calf will not bounce off the cradle (40).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. An animal carrier, comprising:
a frame including a ground engaging portion extending downwardly from opposing lateral sides of the frame;
a lever attached to the frame and extending forwardly therefrom; and
a cradle attached to the frame and extending rearwardly therefrom, said cradle including a rearwardly extending central finger, and a pair of rearwardly extending lateral fingers disposed generally parallel to and above the central finger, said cradle being movable between a lowered loading position wherein the central finger is disposed to be selectively positioned under the body of and between the rear and front legs of the animal, and a raised transport position wherein the central finger supports the animal above the ground and the lateral fingers extend along the sides of the animal to maintain the animal in an upright position;
and further wherein the central finger is formed in an upwardly directed arc.

2. The animal carrier of claim 1 wherein the lateral fingers are formed in an upwardly directed arc.

* * * * *